US010215206B2

(12) United States Patent
Chen et al.

(10) Patent No.: US 10,215,206 B2
(45) Date of Patent: Feb. 26, 2019

(54) CONNECTING STRUCTURE FOR ELECTRONIC DEVICES

(71) Applicant: NANNING FUGUI PRECISION INDUSTRIAL CO., LTD., Nanning (CN)

(72) Inventors: Hsing-Hsu Chen, New Taipei (TW); Chia-Hung Hung, New Taipei (TW); Shih-Wei Lin, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 438 days.

(21) Appl. No.: 15/168,211

(22) Filed: May 30, 2016

(65) Prior Publication Data

US 2017/0343028 A1 Nov. 30, 2017

(51) Int. Cl.
*F16B 5/07* (2006.01)
*F16B 5/00* (2006.01)
*F16M 11/04* (2006.01)
*G06F 1/16* (2006.01)

(52) U.S. Cl.
CPC ......... *F16B 5/0088* (2013.01); *F16M 11/041* (2013.01); *F16B 5/07* (2013.01); *G06F 1/1632* (2013.01)

(58) Field of Classification Search
CPC .......... F16B 5/07; F16B 5/0657; F16B 5/065; F16B 5/0652; F16M 11/041; G06F 1/1632; G06F 1/1679
See application file for complete search history.

(56) References Cited

U.S. PATENT DOCUMENTS

| 1,264,814 | A | * | 4/1918 | Kornstein | E05B 63/126 292/27 |
| 4,799,718 | A | * | 1/1989 | Ing | E05B 63/127 292/36 |
| 6,494,736 | B2 | | 12/2002 | Mito | |
| 8,297,872 | B2 | * | 10/2012 | Wei | F16B 21/073 403/321 |
| 8,425,140 | B2 | * | 4/2013 | Wei | F16B 5/0657 403/330 |

FOREIGN PATENT DOCUMENTS

| CN | 2862145 Y | 1/2007 |
| CN | 201307644 | 9/2009 |
| CN | 101552393A A | 10/2009 |
| CN | 102904108A A | 1/2013 |

(Continued)

*Primary Examiner* — Daniel J Wiley
(74) *Attorney, Agent, or Firm* — ScienBiziP, P.C.

(57) ABSTRACT

A connecting structure connecting a first device and a second device rigidly but readily demountably comprises a housing having a top cover and a bottom cover to form an internal space. A connector which has an engagement block, a sliding block, and an insert block engages with the second device. A push button having a knob movably mounted on the housing, a sprung hooking structure having a guiding slot engaging with the sliding block, and a hook engaging with the second device provide demountable. The push button resists the engagement block via a through hole of the top cover, the connecting structure being combined with the connector to link with the hooking structure.

9 Claims, 12 Drawing Sheets

(56) References Cited

FOREIGN PATENT DOCUMENTS

| CN | 104882724A | A  | 9/2015  |
|----|------------|----|---------|
| TW | 201327605  | A1 | 7/2013  |
| TW | 201340491  | A  | 10/2013 |
| TW | I524328    | B  | 3/2016  |
| TW | I528135    | B  | 4/2016  |

\* cited by examiner

US 10,215,206 B2

CONNECTING STRUCTURE FOR ELECTRONIC DEVICES

FIELD

The subject matter herein generally relates to a connecting structure, and more particularly to a connecting structure used on electronic products.

BACKGROUND

Electronic devices such as tablet PC and personal conference devices may have a handset and a computer or base station, which are connected using screws. However, when the handset is to be separated from the computer, users have to disassemble the screws. Taking conventional electronic devices apart in this way is inconvenient and time-wasting.

BRIEF DESCRIPTION OF THE DRAWINGS

Implementations of the present technology will now be described, by way of example only, with reference to the attached figures, wherein.

DETAILED DESCRIPTION

Figure 1:
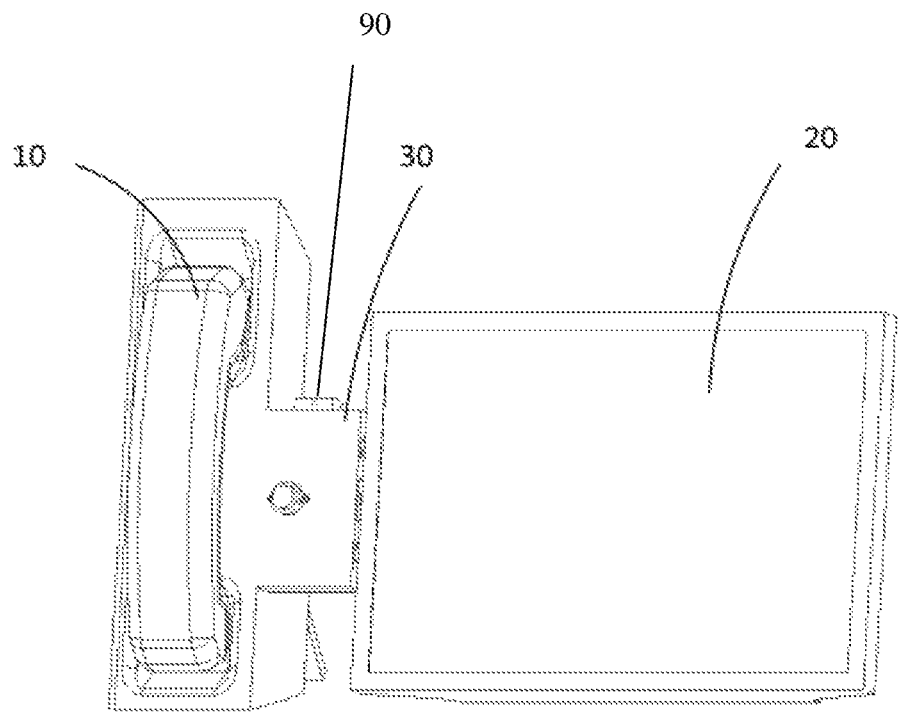
FIG. 1 is a perspective view of a connecting structure used to connect a first device and a second device in accordance with an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings in which like reference numerals indicate the same or similar elements. It should be noted that references to "an" or "one" embodiment in this disclosure are not necessarily to the same embodiment, and such references can mean "at least one".

FIG. 1 is a perspective view of a connecting structure for connecting a first device and a second device in accordance with an embodiment of the disclosure. The connection structure 30 is for connecting a first device 10 and a second device 20. In an exemplary embodiment, the first device 10 may be a handset, the second device 20 may be a computer or base station. The first device 10 is shown as a handset and the second device 20 is shown as a display in FIG. 1, however, the first device 10 may be any type of communication devices or portable electronic devices (such as a charger device, a loudspeaker etc.), and the second device 20 may be a device such as a rechargeable phone or tablet.

Figure 2:
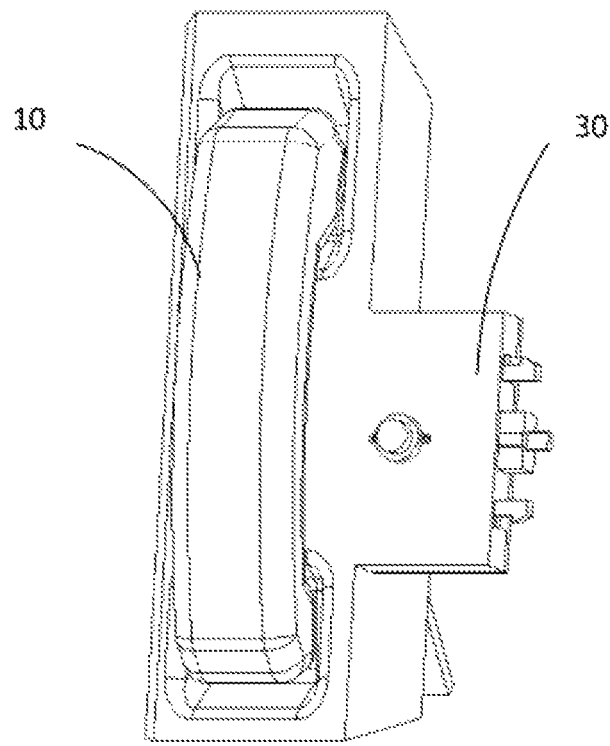
FIG. 2 is a perspective view of the connecting structure fixed to the first device in accordance with an embodiment of the disclosure.

FIG. 2 shows the portion of the connecting structure associated with the first device. As shown, one end of the connecting structure 30 is integral with the first device 10, and the other end of the connecting structure 30 for connection with or separation from the second device 20. It is also possible, one end of the connecting structure 30 is integral with the second device 20, and the other end of the connecting structure 30 for connection with or separation from the first device 10

Figure 3:
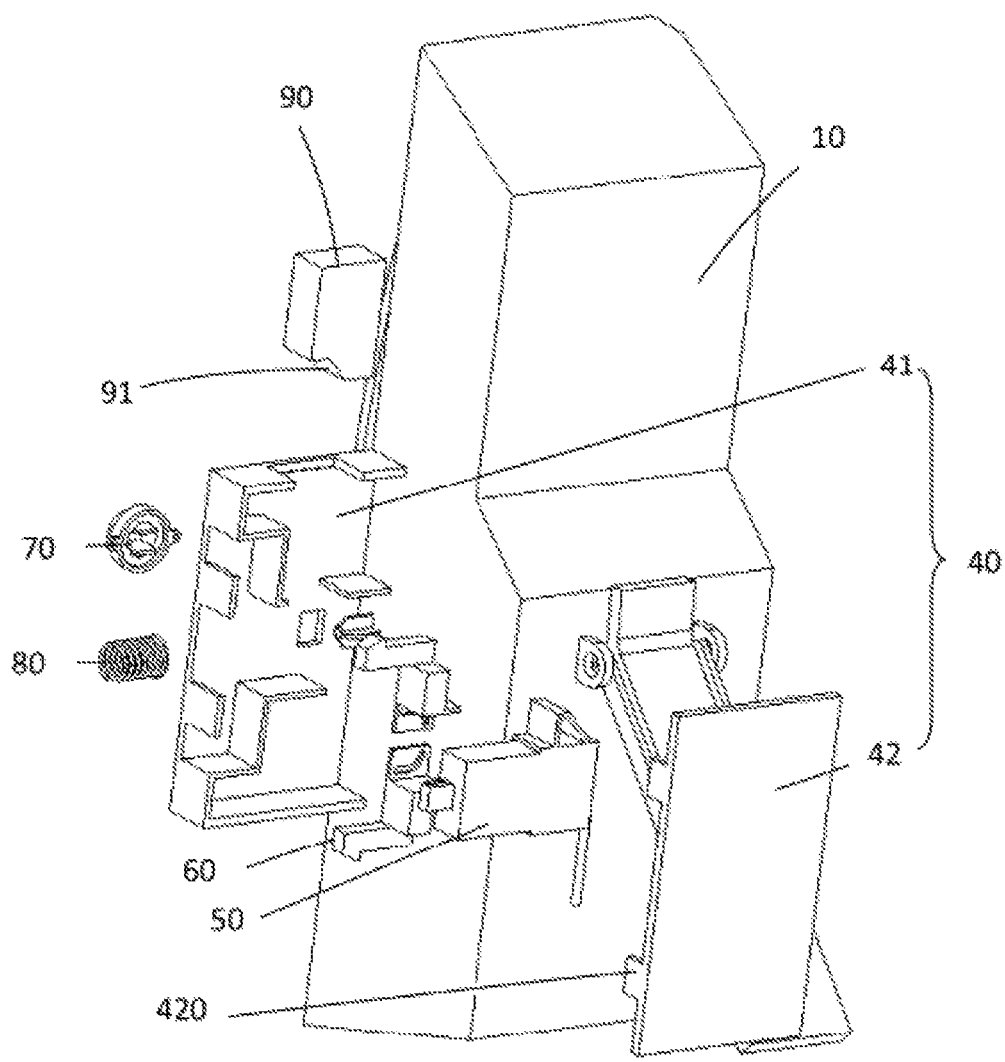
FIG. 3 is an exploded perspective view of the connecting structure in accordance with an embodiment of the disclosure.
Figure 8A:
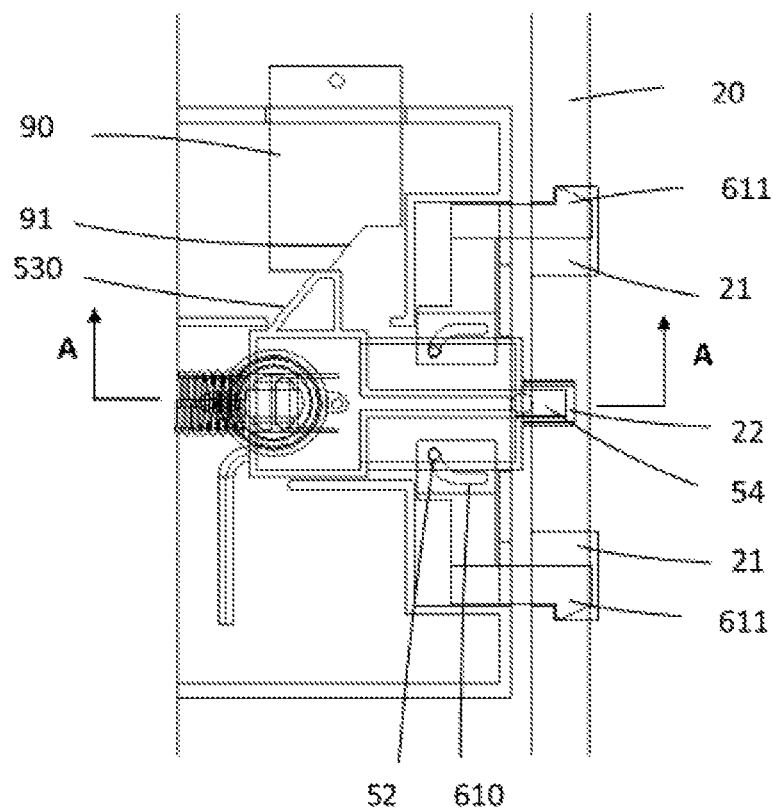
FIG. 8a is an view illustrating the connecting structure assembled to the second device.
Figure 8B:
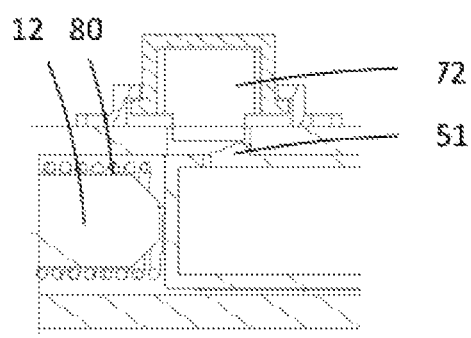
FIG. 8b is a cross-sectional view taken along line A-A of FIG. 8a, showing the connecting structure in a first position.
Figure 9A:
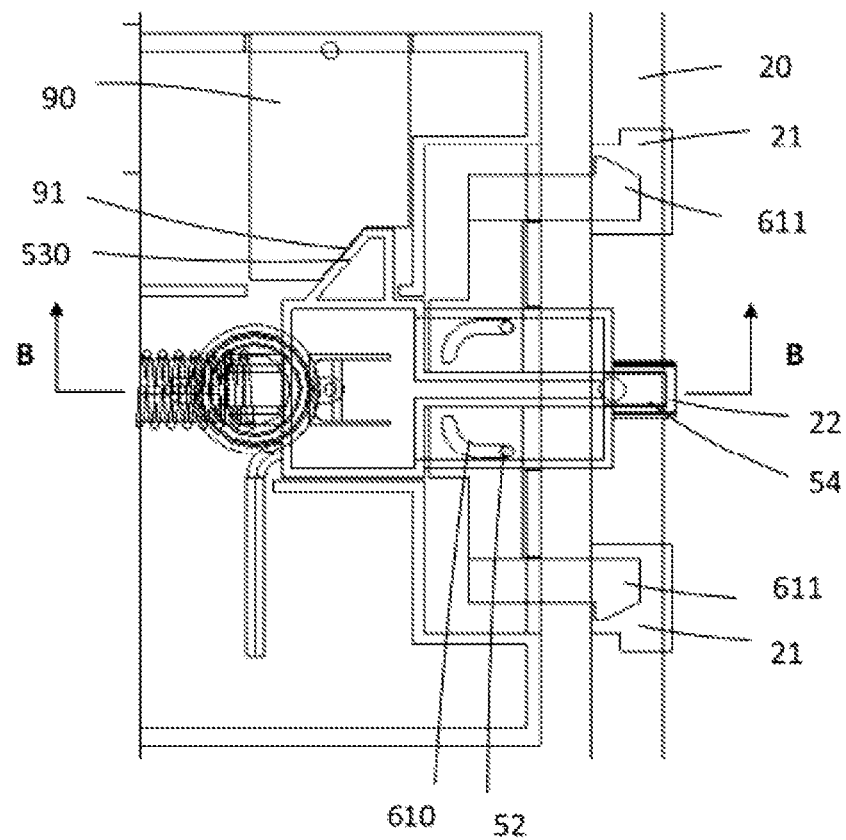
FIG. 9a is an view illustrating the mode of operation and demountability of the connecting structure.
Figure 9B:
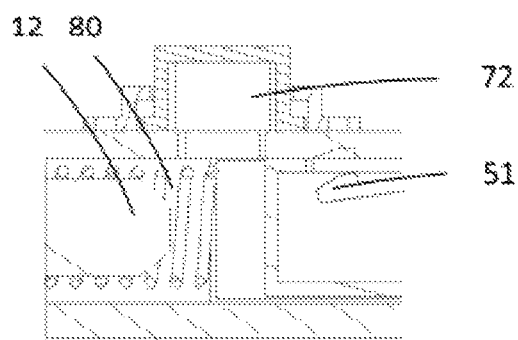
FIG. 9b is a cross-sectional view taken along line B-B of FIG. 9a, showing the connecting structure in a second position.

FIG. 3 also shows the connecting structure, as associated with the first device 10. The connecting structure includes a housing 40, a connector 50, a hooking structure 60, a push button 70, an elastic element 80, and a camera 90. The housing 40 comprises a top cover 41 and a bottom cover 42. The combination of the top cover 41 and the bottom cover 42 forms an internal space to receive the connector 50, the hooking structure 60, the push button 70, the elastic element 80, and the camera 90. The connector 50 is securely connected with the housing 40 and the second device 20, and the hooking structure 60 is securely connected with the connector 50 and the second device 20. The camera 90 protrudes out from the housing 40 or is received in the housing 40 by pressing the push button 70. The hooking structure 60 is detachable from the second device 20. The camera 90 includes a second slope 91 (see in FIG. 8a, FIG. 8b), when the first and second devices are attached to each other, the camera 90 is exposed (see FIG. 1) by pushing against the second slope 91 to take photos and provide images, when the first device is separated from the second device, the camera 90 is received in the receiving groove 419 by pressing the push button 70, the detail of the camera 90 exposed or into a storage position states in the below paragraphs (with FIG. 8a, FIG. 8b).

Figure 4:
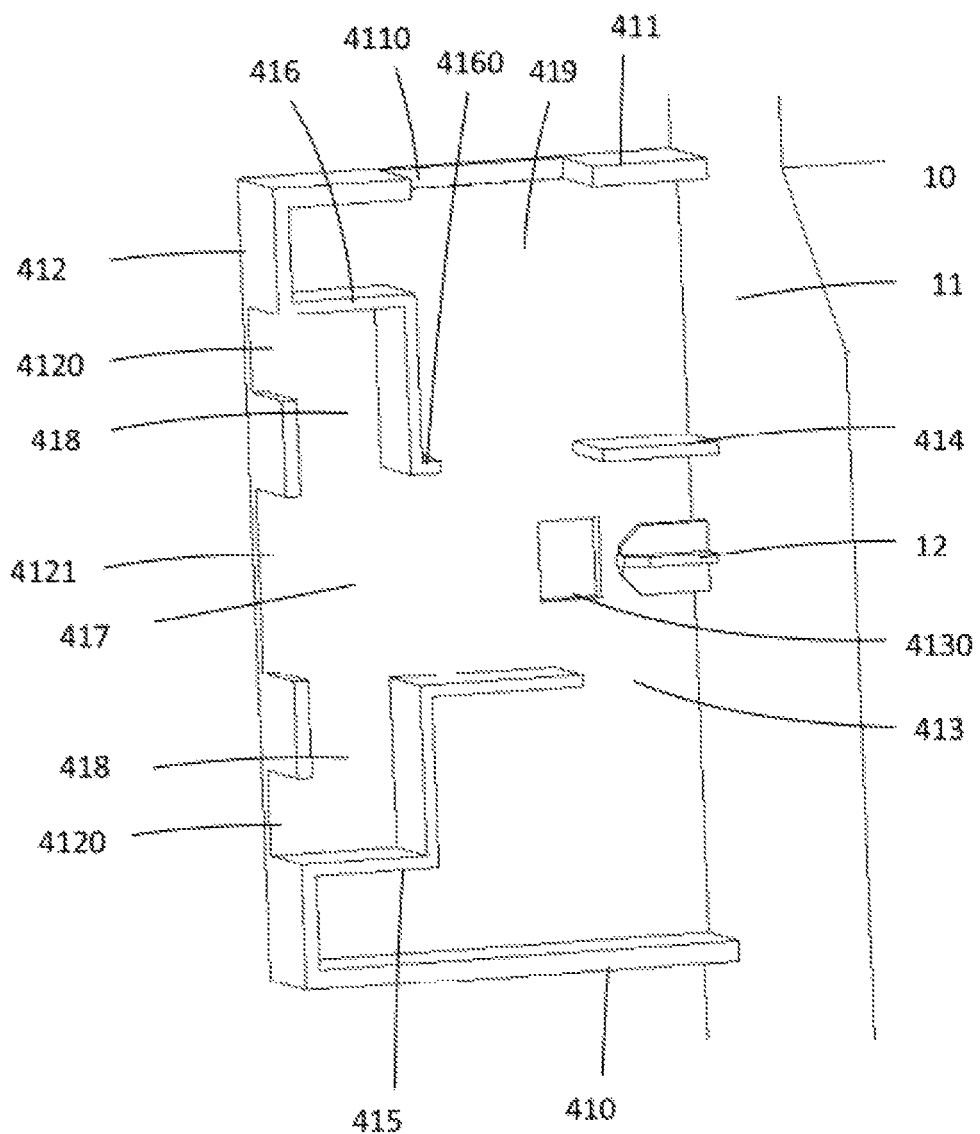
FIG. 4 is an enlarged perspective view of a top cover in the connecting structure shown in FIG. 3.

FIG. 4 is an enlarged view of a top cover in the connecting structure shown in FIG. 3. The top cover 41 is integrally formed with the first device 10 and extends out from one sidewall 11 of the first device 10. The top cover 41 includes a front plate 410, a back plate 411, a side plate 412, a top plate 413, and a stop block 414, a first guide wall 415, and a second guide wall 416 extending inside the side plate 412. In an embodiment, the first guide wall 415 can be in a "Z" shape, and the second guide wall 416 can be in an "L" shape, and a protrusion 4160 perpendicularly extends from the end of the second guide wall 416. The back plate 411 defines a first opening 4110 and the side plate 412 defines a second opening 4120 and a third opening 4121. The side plate 412, the first guide wall 415, the second guide wall 416, and the top plate 413 form a sliding groove 417 and a second guiding groove 417. The back plate 411, the top plate 413, the stop block 414, and the second guide wall 416 form a receiving groove 419. Referring to FIG. 3 and FIG. 4, a flange 420 of the bottom cover 42 is engaged with the second opening 4120 in the side plate 412 of the top cover 41. The sliding groove 417, the guiding groove 418, and the receiving groove 419 are within the internal space formed by the top cover 41 and the bottom cover 42. The top plate 413 of the top cover 41 defines a through hole 4130, the post 12 being integrally formed with and within the internal space of the first device 10. The connector 50 is slideable along the sliding groove 417, the hooking structure 60 is slideable along the guiding groove 418, the elastic element 80 is placed over the post 12 and resists the connector 50, and the camera 90 is slideable in the receiving groove 419.

Figure 5:
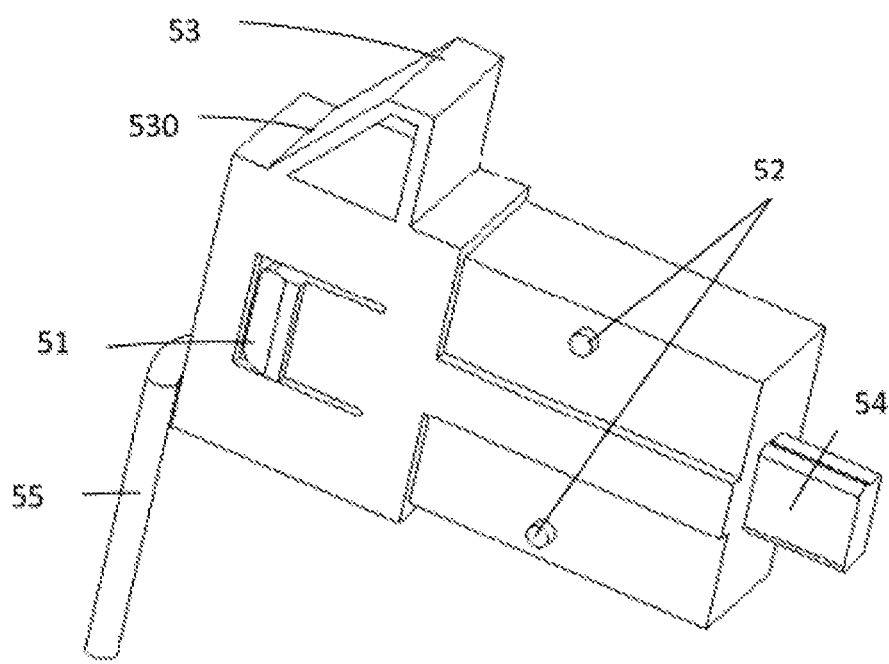
FIG. 5 is an enlarged perspective view of a connector in the connecting structure shown in FIG. 3.

Referring to FIG. 5, the connector 50 includes an engaging block 51, a sliding block 52, a resisting portion 53 with a first slope 530, and an insert block 54.

Figure 6:
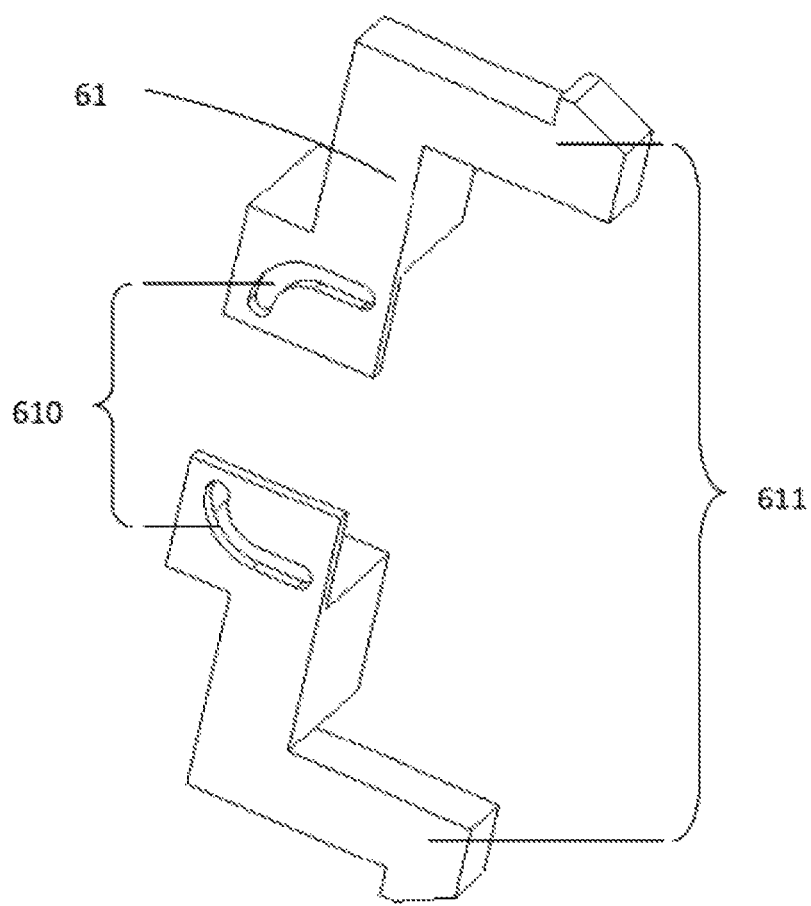
FIG. 6 is an enlarged perspective view of a hooking structure in the connecting structure shown in FIG. 3.

Referring to FIG. 6, the hooking structure 60 includes two hooking structure portions 61, each hooking structure portion 61 defines a guiding slot 610 and a hook 611. In the exemplary embodiment, the guiding slot 610 can be an arc such that the two hooking structure portions 61 can be moved closer to or farther from each other.

Figure 7A:
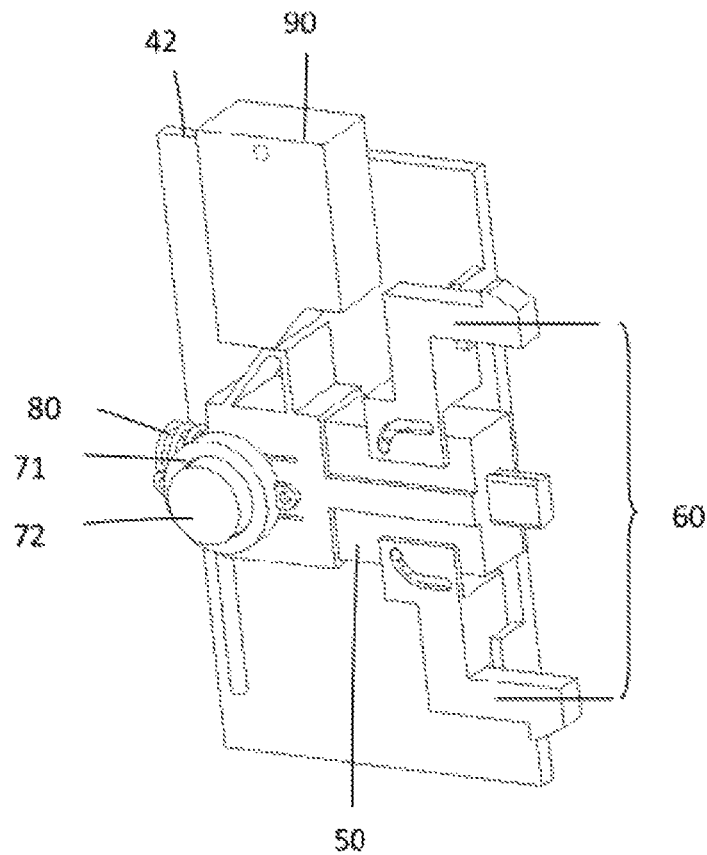
FIG. 7a is an assembled perspective view of the connecting structure without the top cover.
Figure 7B:
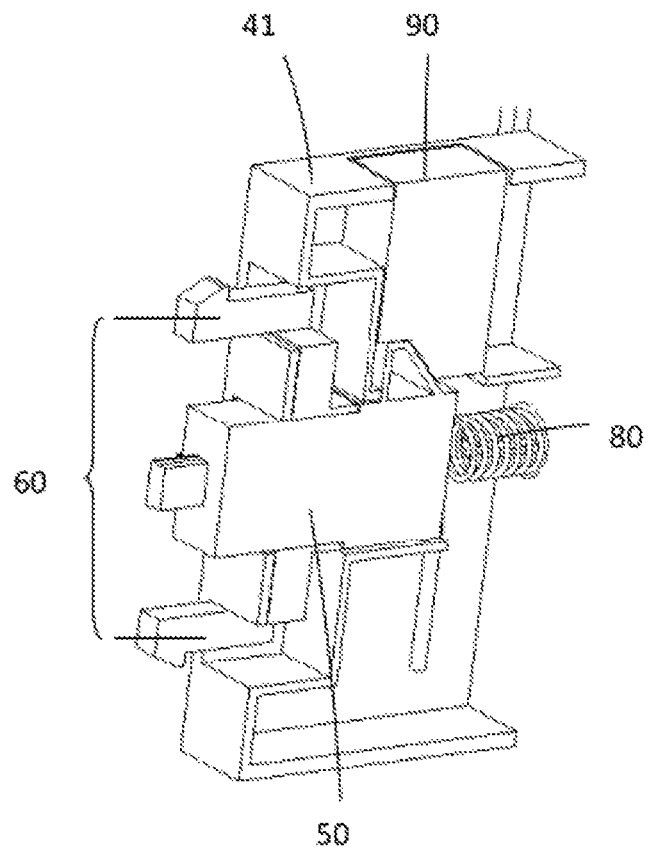
FIG. 7b is an assembled perspective view of the connecting structure without the bottom cover.

Referring to FIG. 7a and FIG. 7b, the push button 70 includes a fixed portion 71 fixed on the top cover 41 and a knob 72 passing through the through hole 4130 and protruding out of the top wall 413 (shown in FIG. 4). The elastic element 80 is placed over the post 12 and resists the connector 50 in the internal space. The elastic element 80 may be a spring.

Referring to FIG. 3 to FIG. 4 and FIG. 7a to FIG. 7b, in assembly, the elastic element 80 is placed over the post 12 and the hooking structure 60 is arranged on the guiding groove 418. The hook 611 of the hooking structure 60 protrudes out from the second opening 4120, the connector 50 is arranged on the sliding groove 471, and the guiding slot 610 of the hooking structure 60 is engaged with the sliding block 52 of the connector 50. The connector 50 extends partially out from the third opening 4121, one end of the connector 50 is resisted by the elastic element 80, and the camera 90 is arranged on the receiving groove 419. Each of the first slope 530 of the resisting portion 53 and the second slope 91 of the camera 90 work against each other, the camera 90 is received in the internal space, and the push button 70 is securely connected with the top cover 41. The knob 72 of the push button 70 passes through the through hole 4130 of the top plate 413 as it moves. When the first and second devices are attached to each other, the camera 90 is exposed (FIG. 1) by pushing against the second slope 91 to take photos and provide images, when the first device is separated from the second device, the camera 90 is received in the receiving groove 419.

Referring to FIG. 3 to FIG. 4 and FIG. 8a to FIG. 8b, the second device 20 includes a latching slot 21 to receive the hook 611 and an insert aperture 22 to receive the insert block 54. When the hooks 611 of the hooking structure 60 are inserted into the latching slot 21, the connector along with the sliding groove 417 is moved toward inside of the housing 40, and the sliding block 52 is engaged with the guiding slot 610. The sliding block 52 is moved along with the guiding slot 610 to spread or to close the two hooking structure portions 61 away from or closer to each other. The first slope 530 of the resisting portion 53 and the second slope 91 of the camera 90 move against each other, and the camera 90 is moved along with the receiving groove 419 and passes through the first opening 4110 with part of the camera 90 protruding out from the housing 40. The insert block 54 of the connector 50 is completely inserted into the insert aperture 22 of the second device 20 when the engaging block 51 is moved and latches in the through hole 4130 of the top plate 413. The hooks 611 of the hooking structure 60 hook into the latching slot 21 to join the first device 10 to the second device 20, the elastic element 80 being pressed by the connector.

Referring to FIG. 3 to FIG. 4 and FIG. 9a to FIG. 9b, when the connector 50 is separated from the insert aperture 22 of the second device 20, the knob 72 resists the engaging block 51 of the connector 50 so as to detach the engaging block 51 from the through hole 4130 by pressing the knob 72 of the push button 70. The connector along with the sliding groove 417 move toward outside of the housing 40, the hooks 611 of the hooking structure 60 move closer to each other with the help of the sliding block 52 along with the guiding groove 610, to detach the hooks 611 from the latching slot 21, and the camera 90 is received in the receiving groove 419 for the camera 90 weight itself.

The connecting structure is combined with the connector to link with the hooking structure, which provides not only a strong and rigid fixation between the first device and the second first device, but is also readily detachable by inserting the connector and the hooking structure or by just pushing the knob.

Many details are often found in the art such as the other features of a connecting structure. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A connecting structure connected between a first device and a second device, comprising:
    a housing having a top cover and a bottom cover, wherein the top cover and the bottom cover forms an internal space;
    a connector having an engaging block, a sliding block and an insert block engaged with the second device;
    a push button having a knob movably mounted on the housing;
    a hooking structure having a guiding slot engaged with the sliding block and a hook engaged with the second device; and
    an elastic element bringing the hooking structure to an original position,
    wherein the push button resists the engaging block via a through hole of the top cover.

2. The connecting structure of claim 1, wherein the top cover of the housing is integrally formed with the first device.

3. The connecting structure of claim 1, wherein the internal space comprises a sliding groove, a guiding groove and a receiving groove, the connecting structure further comprises a camera in the internal space, the connector is received in the receiving groove and is slideable along with the sliding groove, the hooking structure is slideable along with the guiding groove, and the camera is slideable in the receiving groove.

4. The connecting structure of claim 3, wherein the top cover defines a first opening, the connector has a resisting portion with a first slope, the camera has a second slope, wherein the first slope of the resisting portion and the second slope of the camera is pushed with each other, and the camera is moved along with the receiving groove and passed through the first opening with part of the camera protruding out from the housing.

5. The connecting structure of claim 1, wherein the first device is connected to the sidewall of the housing having a post.

6. The connecting structure of claim 5, wherein the elastic element is placed over the post, the elastic element resists the connector.

7. The connecting structure of claim 1, wherein the push button has a fixed portion attached to the housing.

8. The connecting structure of claim 1, wherein the hooking structure comprises a first hooking structure portion having a first hook and a second hooking structure portion having a second hook, the first hooking structure portion and the second hooking structure portion is disposed on two sides of the hooking structure.

9. The connecting structure of claim 8, wherein the second device has a latching slot to receive the hook and an insert aperture to receive the insert block, wherein the first hook, the second hook and the insert block of the connector is securely connected with the second device.

* * * * *